United States Patent [19]

Jain

[11] Patent Number: 5,438,497
[45] Date of Patent: * Aug. 1, 1995

[54] TERTIARY SIDE RESONANT DC/DC CONVERTER

[75] Inventor: Praveen K. Jain, Kanata, Canada

[73] Assignee: Northern Telecom Limited, Montreal, Canada

[ * ] Notice: The portion of the term of this patent subsequent to Oct. 20, 2009 has been disclaimed.

[21] Appl. No.: 59,973

[22] Filed: May 13, 1993

[51] Int. Cl.[6] .................................. H02M 3/335
[52] U.S. Cl. .................................. 363/17; 363/132
[58] Field of Search ........................ 363/17, 98, 132

[56] References Cited

U.S. PATENT DOCUMENTS

| | | | |
|---|---|---|---|
| 4,041,355 | 8/1977 | Onodera | 315/411 |
| 4,355,243 | 10/1982 | Tellert | 307/261 |
| 4,679,129 | 7/1987 | Sakakibara et al. | 363/17 |
| 4,720,667 | 1/1988 | Lee et al. | 323/271 |
| 4,720,668 | 1/1988 | Lee et al. | 323/271 |
| 4,814,962 | 3/1989 | Magahaes et al. | 363/16 |
| 4,833,584 | 5/1989 | Divan | 363/37 |
| 4,841,220 | 6/1989 | Tabisz et al. | 323/282 |
| 4,857,822 | 8/1989 | Tabisz et al. | 323/282 |
| 4,935,857 | 6/1990 | Nguyen et al. | 363/17 |
| 5,073,849 | 12/1991 | Morris | 363/134 |
| 5,157,593 | 10/1992 | Jain | 363/17 |
| 5,159,541 | 10/1992 | Jain | 363/26 |
| 5,177,675 | 1/1993 | Archer | 363/134 |
| 5,208,738 | 5/1993 | Jain | 363/17 |

Primary Examiner—Jeffrey L. Sterrett
Attorney, Agent, or Firm—Yoshiharu Toyooka

[57] ABSTRACT

Resonant DC/DC converters are disclosed. The DC/DC converters according to the present invention include a bridged inverter, a resonant circuit, a high frequency transformer and a rectifying circuit. The high frequency transformer has a tertiary winding. The resonant circuit consists of a series resonant branch connected to the transformer primary winding and a parallel resonant branch connected across the tertiary winding. The converters require less capacitive components and lend themselves well to miniaturization.

4 Claims, 5 Drawing Sheets

*FIGURE 1 : PRIOR ART*

TERTIARY SIDE RESONANT DC/DC CONVERTER

FIELD OF THE INVENTION

The present invention relates to DC/DC converters which find wide areas of application as a power supply. In particular, the invention is directed to high frequency resonant mode DC/DC converters whose operating frequency is set constant.

BACKGROUND OF THE INVENTION

In many advanced telecommunication systems, high performance DC/DC power converters are used to supply conditioned power to electronic cards. Some of the basic requirements for this power conversion are:
1. high power density
2. high efficiency
3. low EMI (both conducted and radiated); and
4. constant operating frequency.

In order to achieve high power densities, there is a trend to operate power supplies at higher switching (operating) frequencies. As the switching frequencies increase, the switching losses associated with the turn-on and turn-off of the devices in the power supplies also increase. In switch mode power supplies, these losses are so significant that the operation of the power supplies at very high frequencies are prohibitive due to low conversion efficiencies. However, in resonant mode power supplies, the switching losses are low, which allow operation of resonant converters at very high frequencies. The resonant mode DC/DC converter can be classified into the following categories:
(1) full-resonant DC/DC converters;
(2) quasi-resonant DC/DC converters; and
(3) multi-resonant DC/DC converters A number of U.S. patents have been issued for resonant mode DC/DC converters, e.g. U.S. Pat. Nos. 4,814,962 issued Mar. 21, 1989 (Magalhaes et al); U.S. Pat. No. 4,679,129 issued Jul. 7, 1987 (Sakakibara et al); U.S. Pat. No. 4,355,243 issued Oct. 19, 1982 (Tellert); U.S. Pat. No. 4,935,857 issued Jun. 19, 1990 (Nguyen et al); U.S. Pat. No. 4,833,584 issued May 23, 1989 (Divan) on full-resonant DC/DC converters; U.S. Pat. Nos. 4,720,667 and 4,720,668 issued Jan. 19, 1988 (Lee et al) on quasi-resonant DC/DC converters; and U.S. Pat. Nos. 4,841,220 issued Jun. 20, 1989 and U.S. Pat. No. 4,857,822 issued Aug. 15, 1989 (both to Tabisz et al) on multi-resonant DC/DC converters. The converter topologies described in the above-referenced patents have switching losses reduced to near zero, however, their output voltage is controlled and/or changed by varying the operating (also called switching) frequency. These converters are, therefore, unsuitable for applications where system synchronization is required, i.e. in a telecommunications environment.

Applicant's U.S. Pat. Nos. 5,208,738 issued May 4, 1993, U.S. Pat. No. 5,157,593 issued Oct. 20, 1992 and U.S. Pat. No. 5,159,541 issued Oct. 27, 1992 teach constant frequency resonant DC/DC converters. These converters exhibit near zero switching losses and are suitable for very high frequency operation. From a practical point of view, however, these converter topologies have the following limitations:
1. Due to mismatching in the values and voltage ratings of the commercially available high frequency capacitors and the actual value and voltage of the parallel branch capacitor, a number of capacitors are normally required to overcome this mismatching and to meet the design requirements. This results in a physically large size parallel resonant branch.
2. Since the parallel branch is connected between the primary of the
2. Since the parallel branch is connected between the primary of the transformer and the series resonant branch, the power transfer capability of the converter decreases at increasing operating frequencies due to the leakage inductance of the transformer. This results in lower power density of the converter.
3. Since the capacitor of the parallel branch is connected between the series inductor and primary winding of the transformer, the three magnetic components (series inductor, parallel inductor and transformer) cannot be integrated into a single magnetic structure.

OBJECTS OF THE INVENTION

It is therefore an object of the present invention to provide constant frequency resonant DC/DC converters which are efficient in operation and use less components.

It is another object of the present invention to provide a constant frequency resonant DC/DC converter which lend themselves easily to miniaturization.

It is yet another object of the present invention to provide a constant frequency resonant DC/DC converter which includes parallel and series resonant branches.

It is a further object of the present invention to provide a constant frequency resonant DC/DC converter which includes a parallel resonant branch in the tertiary circuit of the transformer.

SUMMARY OF THE INVENTION

Briefly stated the present invention relates to a resonant DC/DC converter operating at a constant operating frequency. The converter comprises a bridged inverter for converting a DC input to an AC of constant operating frequency and a series resonant branch connected to the bridged inverter for sending the constant frequency AC to the primary winding of a transformer to generate a secondary AC in its secondary winding. The converter further includes a rectifier circuit connected to the secondary winding to rectify the secondary AC to produce a stable DC output. The present invention is characterized in that the transformer further comprises a tertiary winding and a parallel resonant branch is connected across the tertiary winding, both the series and parallel resonant branches being tuned at the constant operating frequency.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS

Figure 1:
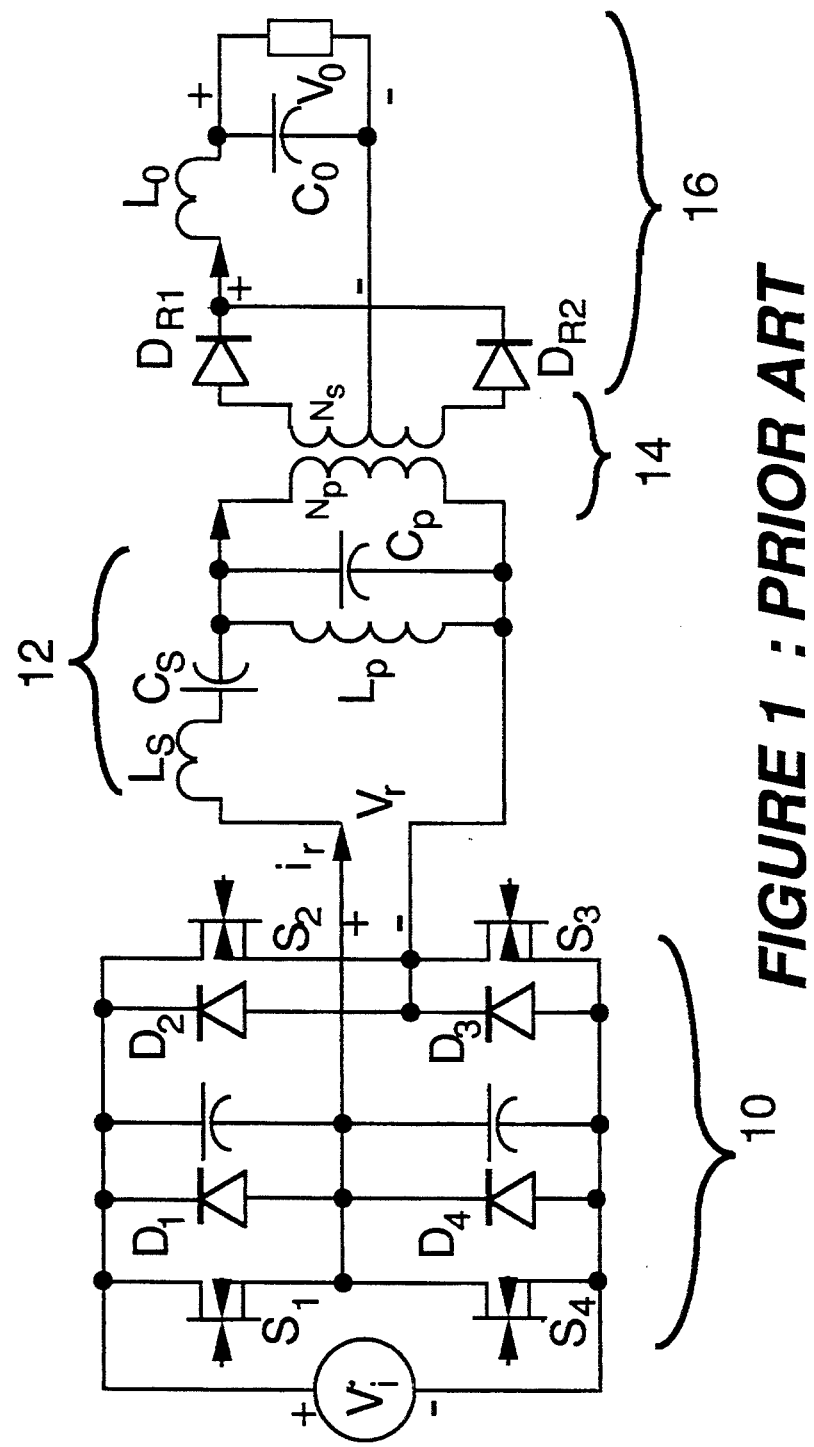
FIG. 1 is a circuit diagram of a known constant frequency resonant DC/DC converter.

FIG. 1 is a circuit diagram of a resonant DC/DC converter according to the prior art. The converter includes a full bridge inverter 10, a resonant circuit 12, a transformer 14 having the primary winding $N_p$ and secondary winding $N_s$, and a rectifier circuit 16. The converter operates at a constant switching frequency controlled by gate signals applied to the gates of FETs $S_1$–$S_4$. As seen in the figure, the resonant circuit 12 includes a parallel resonant branch and series resonant branch. The parallel resonant branch consists of a parallel capacitor $C_p$ and parallel inductor $L_p$ across the primary winding of the transformer. The series resonant branch consists of a series capacitor $C_s$ and series inductor $L_s$ in series with the primary winding of the transformer 14. An input DC $V_i$ is converted to an AC output (voltage $V_r$ and current $I_r$) which is in turn applied to the transformer through the resonant circuit. The rectifier circuit produces a rectified DC output $V_0$. This converter has the above-mentioned limitations.

Figure 2:
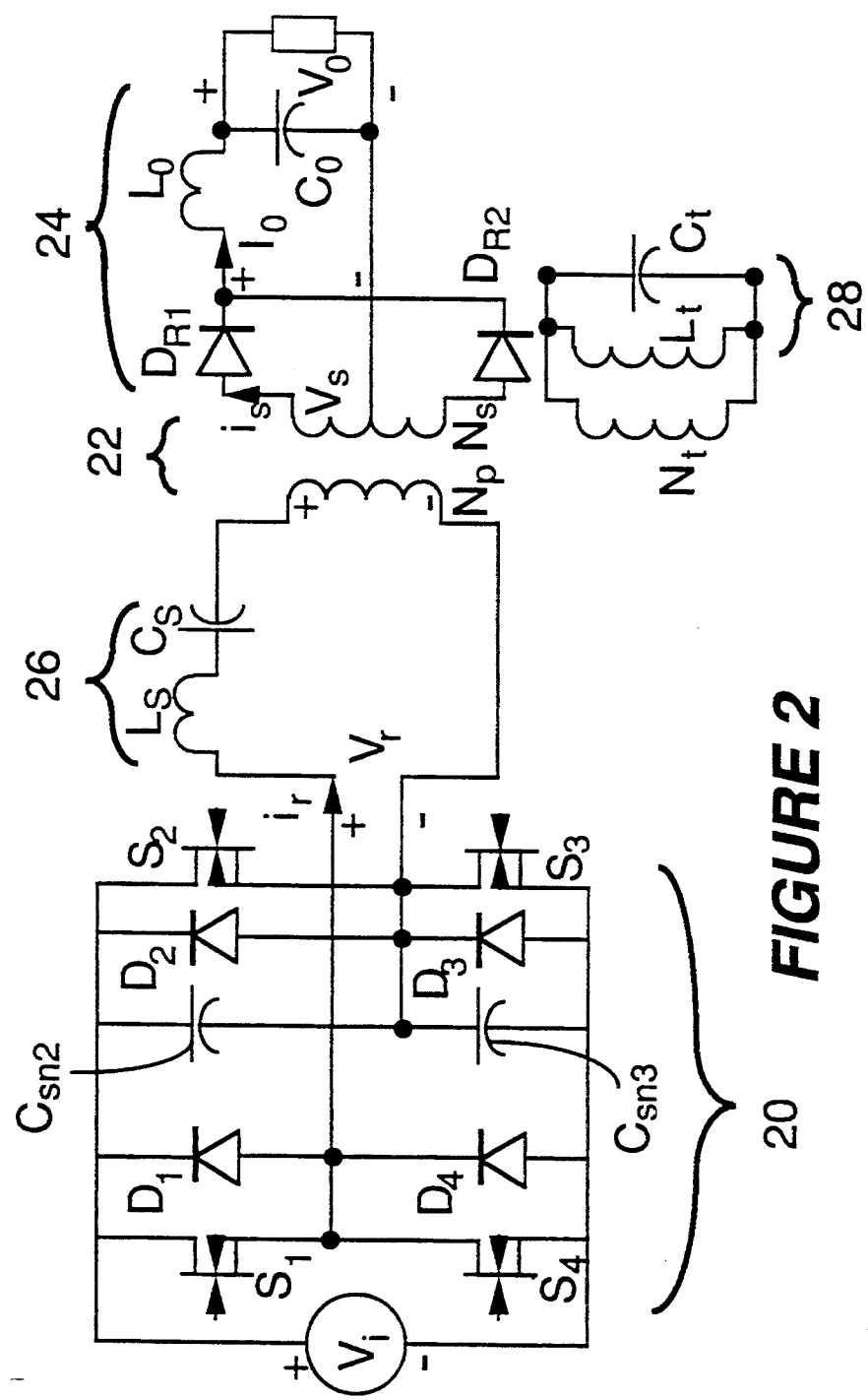
FIG. 2 is a circuit diagram of a constant frequency resonant DC/DC converter according to one embodiment of the present invention.

FIG. 2 is a circuit diagram of the tertiary side parallel tuned resonant DC/DC converter according to one embodiment of the present invention. This converter also includes a bridged inverter 20, a transformer 22 and a rectifier circuit 24. The transformer 22 has a primary winding $N_p$, secondary winding $N_s$ and tertiary winding $N_t$. The resonant circuit employed in the converter has a series branch 26 and a parallel branch 28, both of which are tuned to the operating frequency of the converter. The series branch has a series inductor $L_s$ and a series capacitor $C_s$ and is connected in series with the primary winding $N_p$ of the transformer 22. The parallel branch has a parallel inductor $L_t$ and a pararell capacitor $C_t$ but, unlike in the arrangement of FIG. 1, the parallel branch is connected in parallel across the tertiary winding $N_t$ of the transformer 22. The rectifier circuit 24 is connected to the secondary winding $N_s$ of the transformer 22. This topological arrangement results in the following advantages:

1. It gives greater flexibility in matching the value and voltage rating of commercially available high frequency capacitors to the actual value and voltage rating of the parallel branch capacitor determined by the design requirements. This results in the physically small size of the parallel resonant branch.
2. Since the parallel branch is now connected across the tertiary winding of the transformer, the effect of leakage inductance is significantly reduced on the power transfer capability of the converter.
3. Since the capacitor of the parallel branch is connected across the tertiary winding of the transformer, the three magnetic components (series inductor, parallel inductor and transformer) can now be integrated into a single magnetic structure.

The above points will be described in more detail below.

a) Matching of commercially available high frequency resonant capacitors:

If Vp is the primary voltage across the transformer and VR is the rated voltage of a commercially available capacitor, the turn-ratio between the primary and tertiary windings is given by:

$$N_t/N_p = V_R/V_p \quad (1)$$

To maintain the same Q (quality factor) of the parallel branch at the primary side of the transformer, the tertiary side capacitor is given by:

$$C_t = (N_p/N_t)^2 C_p \quad (2)$$

Figure 3:
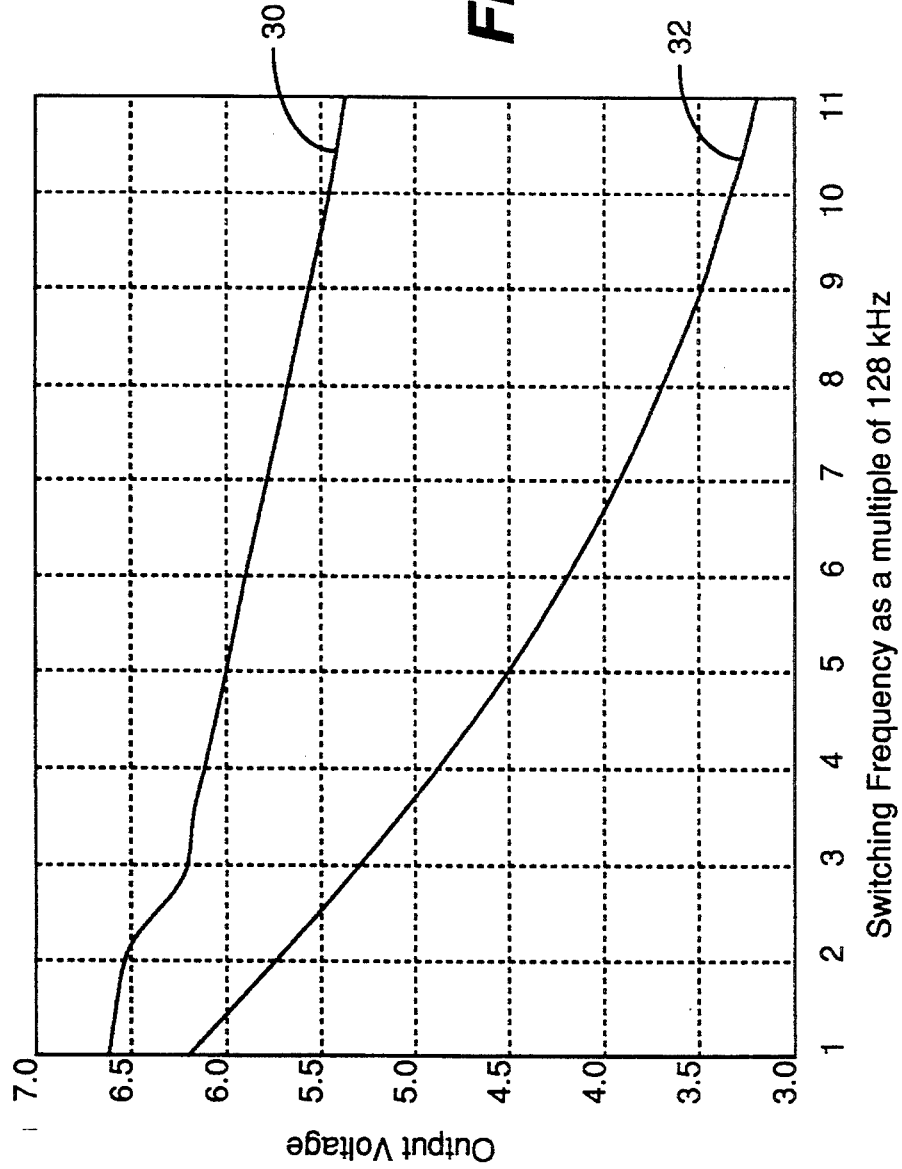
FIG. 3 is a graph showing the effects of the leakage inductor as a function of the operating frequency on the output voltage.
Figure 4:
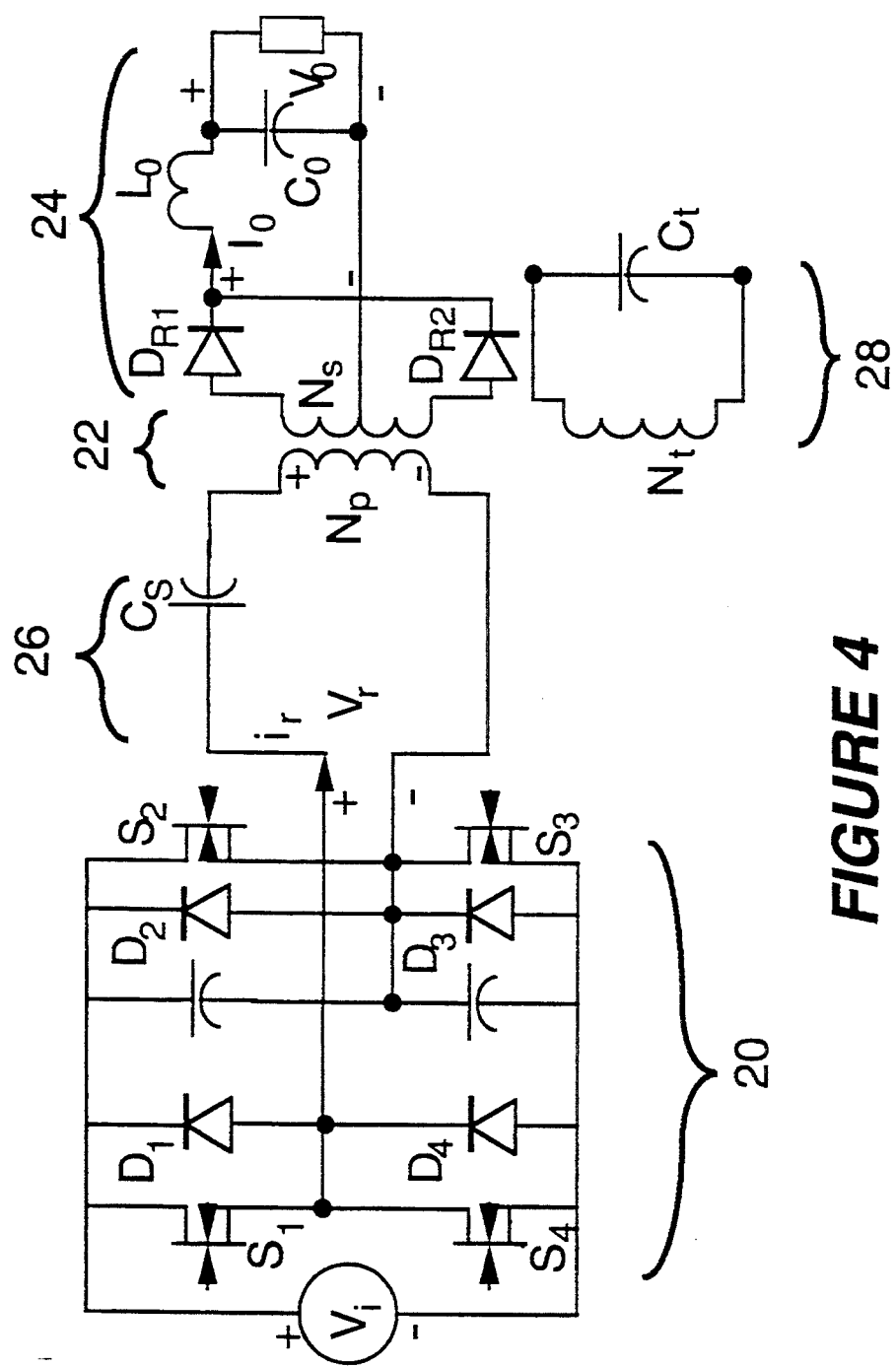
FIG. 4 is a circuit diagram of a constant frequency resonant DC/DC converter according to another embodiment of the present invention.

Equations (1) and (2) above show that by adjusting the turn-ratio $N_t/N_p$, one can match rated voltage and capacitance values of commercially available capacitors to the values determined by the design requirements. For example, in a current design based on primary side resonance, four capacitors of 0.22 µF are used to give a total capacitance of 0.88 µF. These capacitors are rated for 60 V RMS at 128 kHz frequency. The voltage which appears across these capacitors is about 30 V RMS. If the voltage rating of these capacitors is matched at the tertiary side, a turn-ratio of 2.0 is obtained from equation (1). Then, to maintain the same Q, the capacitor required at the tertiary side, from equation (2), is s 0.22 µF. This means that now only one capacitor is required if the parallel resonant circuit is placed at the tertiary side. Of course, the parallel inductor must now be adjusted to give the same tuned frequency but a modification in the high frequency inductor does not involve a large change in size.

b) Effect of leakage inductance:

FIG. 3 shows the effect of leakage inductance on the output voltage of the converter as a function of frequency for the primary side and tertiary side resonance. This figure clearly shows better performance of the tertiary side resonance over the primary side resonance (shown by a graph designated by numeral 30). (Shown by a graph designated by numberal 32). This improvement is realized because the leakage inductor in this configuration is divided into three parts: (i) primary leakage is compensated for by the series inductor; (ii) leakage of the tertiary winding comes in series with the parallel branch when referred to the primary, and does not contribute to the drop in output voltage; (iii) secondary leakage at the input of the rectifier causes commutation overlap which is significantly smaller than the commutation overlap if the parallel branch were connected at the primary. This results in higher power density of the converter.

c) Integrated magnetic:

Since the capacitor of the parallel branch is connected across the tertiary of the transformer, the series inductor, the parallel inductor and the transformer can now be integrated into a single magnetic structure. FIG. 4 shows an embodiment using the concept of tertiary side resonant converter with integrated magnetic component, that is, the series inductor $L_s$ is now integrated to the primary winding $N_p$ and the parallel inductor $L_t$ to the tertiary winding $N_t$. In FIG. 4, like components are designated by like numerals of FIG. 2.

In addition to the above benefits, six out of eight switching losses are eliminated in these topologies without additional penalty on the conduction losses.

Figure 5:
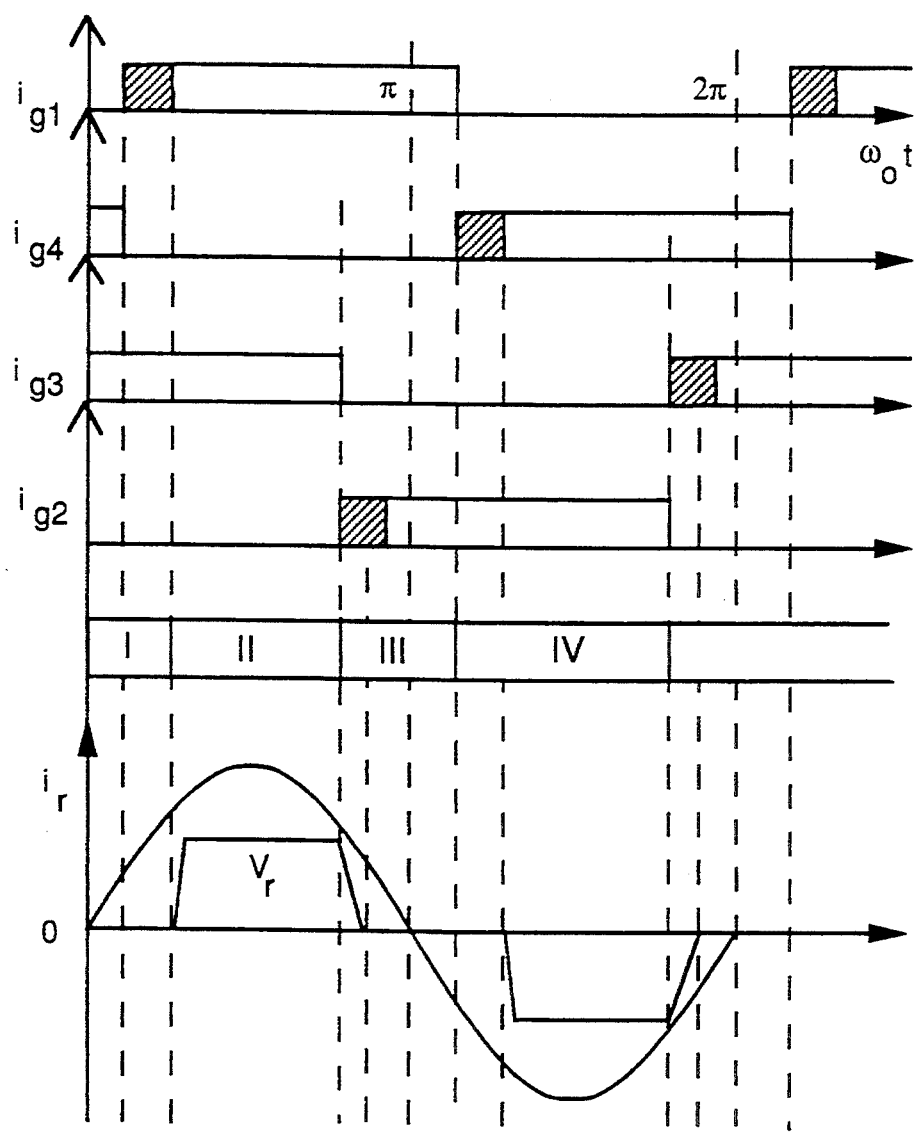
FIG. 5 is graph showing gating signals and switching instants of the converter of the present invention.

FIG. 5 shows the gating signals and switching instants of the converter according to the present invention. The shaded portion of each gating signal $i_{g1}$–$i_{g4}$ represents the leading edge time delay $t_d$. Referring to FIGS. 2 and 5, the details of the switching instants I–IV are given below:

Switching Instant I:

At the beginning of this interval, gating signal $i_{g4}$ applied to the gate of switch $S_4$ has been removed. The positive resonant current $i_r$ now forces diode $D_4$ to conduct. The conduction of diode $D_4$ provides near zero voltage across $S_4$ during the turn-off. After the leading edge time delay $t_d$, gating signal $i_{g1}$ has been applied at the gate of switch $S_1$. The resonant current $i_r$ is now transferred from diode $D_4$ to switch $S_q$. Since diode $D_4$ is conducting prior to the conduction of switch $S_1$, turn-on of switch $S_1$ is obtained under full voltage. This results in turn-on loss for the switch $S_1$.

Switching Instant II:

At the beginning of this interval, gating signal $i_{g3}$ applied to the gate of switch $S_3$ has been removed. Switch $S_3$ starts to turn-off, and the snubber capacitor $C_{sn3}$ starts to charge. At the same time, because of the positive resonant current $i_r$, the snubber capacitor $C_{sn2}$ across switch $S_2$ starts to discharge to the resonant circuit. Once voltage across the snubber capacitor $C_{sn2}$ reaches zero, the positive resonant current forces diode $D_2$ to conduct. After the leading edge time delay $t_d$, gating signal $i_{g2}$ has been applied at the gate of switch $S_2$. The resonant current $i_r$ is now transferred from diode $D_2$ to switch $S_2$. Since diode $D_2$ was conducting prior to the conduction of switch $S_2$, turn-on of switch $S_2$ is obtained under zero voltage. This results in zero turn-on loss for the switch $S_2$. Further, since energy stored in the snubber capacitor is discharged to the resonant circuit, a larger value of the snubber capacitor $C_{sn3}$ is employed to provide a slow rise of the voltage across the switch $S_3$. This ensures a close to zero turn-off loss in the switch $S_3$.

Switching Instant III:

At the beginning of this interval, gating signal $i_{g1}$ applied to the gate of switch $S_1$ has been removed. The negative resonant current $i_r$ now forces diode $D_1$ to conduct. The conduction of diode $D_1$ provides near zero voltage across $S_1$ during the turn-off. After the leading edge time delay $t_d$, gating signal $i_{g4}$ has been applied at the gate of switch $S_4$. The resonant current is now transferred from diode $D_1$ to switch $S_4$. Since diode $D_1$ is conducting prior to the conduction of switch $S_4$, turn-on of switch $S_4$ is obtained under full voltage. This results in turn-on loss for the switch $S_1$.

Switching Instant IV:

At the beginning of this interval, gating signal $i_{g2}$ applied to the gate of switch $S_2$ has been removed. Switch $S_2$ starts to turn-off, and the snubber capacitor $C_{sn2}$ starts to charge. At the same time, because of the negative resonant current $i_r$, the snubber capacitor $C_{sn3}$ across switch $S_3$ starts to discharge to the resonant circuit. Once voltage across the snubber capacitor $C_{sn3}$ reaches zero, the negative resonant current forces diode $D_3$ to conduct. After the leading edge time delay $t_d$, gating signal $i_{g3}$ has been applied at the gate of switch $S_3$. The resonant current is now transferred from diode $D_3$ to switch $S_3$. Since diode $D_3$ was conducting prior to the conduction of switch $S_3$, turn-on of switch $S_3$ is obtained under zero voltage. This results in zero turn-on loss for the switch $S_3$. Further, since energy stored in the snubber capacitor is discharged to the resonant circuit, a larger value of the snubber capacitor $C_{sn2}$ is employed to provide a slow rise of voltage across the switch $S_2$. This ensures a close to zero turn-off loss in the switch $S_2$.

I claim:

1. In a resonant DC/DC converter operating at a constant operating frequency which comprises:

bridged inverter means for converting a DC input to an AC of said constant operating frequency;

series resonant branch means connected to said bridged inverter means for sending said AC to the primary winding of transformer means to generate a secondary AC in the secondary winding of said transformer; and rectifier means connected to said secondary winding to rectify said secondary AC to produce a stable DC output;

the invention being characterized in that said transformer further comprises a tertiary winding and a parallel resonant branch means is connected across said tertiary winding, both of said series and parallel resonant branch means being tuned to said constant operating frequency.

2. The resonant DC/DC converter according to claim 1, wherein said parallel resonant branch means comprises a parallel resonant capacitor and a parallel resonant inductor.

3. The resonant DC/DC converter according to claim 1, wherein said parallel resonant branch means comprises a parallel capacitor across the tertiary winding of said transformer, said tertiary winding functioning as a parallel resonant inductor.

4. The resonant DC/DC converter according to claim 3, wherein said series resonant branch means comprises a series resonant capacitor in series with said primary winding, said primary winding functioning as a series resonant inductor.

* * * * *